United States Patent
Studer

(10) Patent No.: US 8,453,580 B2
(45) Date of Patent: *Jun. 4, 2013

(54) MAGNETIC SUSPENSION SYSTEM WITH INTEGRABLE PROPULSION

(75) Inventor: Philip Albert Studer, Silver Spring, MD (US)

(73) Assignees: Sandor Wayne Shapery, San Diego, CA (US); Philip Albert Studer, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,201

(22) Filed: Jun. 20, 2011

(65) Prior Publication Data

US 2011/0247519 A1 Oct. 13, 2011

Related U.S. Application Data

(63) Continuation of application No. 12/048,062, filed on Mar. 13, 2008, now Pat. No. 7,963,228.

(60) Provisional application No. 60/906,554, filed on Mar. 13, 2007.

(51) Int. Cl.
*B60L 13/04* (2006.01)

(52) U.S. Cl.
USPC ............ 104/281; 104/282; 104/284; 104/286

(58) Field of Classification Search
USPC .................. 104/281, 282, 284, 286
See application file for complete search history.

(56) References Cited

U.S. PATENT DOCUMENTS

| | | | |
|---|---|---|---|
| 3,569,804 A | 3/1971 | Studer | |
| 3,594,622 A | 7/1971 | Inagaki | |
| 3,694,041 A | 9/1972 | Studer | |
| 3,706,922 A | 12/1972 | Inagaki | |
| 3,797,402 A | 3/1974 | Karch | |
| 3,797,403 A | 3/1974 | Schwarzler et al. | |
| 3,845,720 A | 11/1974 | Bohn et al. | |
| 3,911,828 A | 10/1975 | Schwarzler | |
| 3,924,537 A | 12/1975 | Matsui et al. | |
| 4,315,197 A | 2/1982 | Studer | |
| 4,324,185 A | 4/1982 | Vinson | |
| 5,009,865 A | 4/1991 | Boden et al. | |
| 5,372,636 A | 12/1994 | Gray et al. | |
| 5,379,864 A | 1/1995 | Colby | |
| 5,757,098 A | 5/1998 | Higuchi et al. | |
| 5,923,109 A | 7/1999 | Higuchi et al. | |
| 5,959,382 A | 9/1999 | Dauwalter | |
| 6,101,952 A | 8/2000 | Thornton et al. | |
| 6,268,673 B1 | 7/2001 | Shah et al. | |
| 6,396,178 B1 | 5/2002 | Chiu | |
| 6,977,451 B2 | 12/2005 | Onishi | |
| 7,617,779 B2 | 11/2009 | Studer | |
| 7,963,228 B2 | 6/2011 | Studer | |
| 2006/0113848 A1 | 6/2006 | Studer | |
| 2009/0032350 A1 | 2/2009 | Shapery | |

*Primary Examiner* — S. Joseph Morano
*Assistant Examiner* — Zachary Kuhfuss
(74) *Attorney, Agent, or Firm* — Knobbe Martens Olson & Bear LLP

(57) ABSTRACT

A method and system for magnetically levitating a load is disclosed. One embodiment of the invention is a system for magnetically levitating a load, the system comprising at least two lift generators, each comprising a source of magnetic flux configured to induce a magnetic flux in a rail via a leg on either side of the rail, at least one magnetically permeable beam connecting the lift generators, and control circuitry configured to generate and modulate a magnetic current flux through the crossbeam so as to maintain gaps between the legs and rail, wherein the gaps defined by the legs on either side of the rail are of unequal size.

20 Claims, 5 Drawing Sheets

_US 8,453,580 B2_

MAGNETIC SUSPENSION SYSTEM WITH INTEGRABLE PROPULSION

CROSS-REFERENCE TO RELATED APPLICATIONS

This application claims the benefit of the earlier filing date under 35 U.S.C. §120 of co-pending U.S. patent application Ser. No. 12/048,062, filed Mar. 13, 2008, which claims priority under 35 U.S.C. §119(e) to U.S. Provisional Application No. 60/906,554 filed Mar. 13, 2007, which are both hereby incorporated by reference in their entireties.

BACKGROUND OF THE INVENTION

1. Field of the Invention

The present invention relates to magnetic suspension systems, and in particular, magnetic suspension systems with integrable propulsion.

2. Description of the Related Art

Levitation systems using permanent magnets have been used as a form of transportation that suspends, guides, and propel vehicles (predominantly trains) using an electromagnetic force to counteract the effects of the gravitational force. Improvements to these systems may enable high speeds without the typical problems of mechanical wear, thermal inefficiency, and noise, as well as other issues prevalent in such systems.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages to magnetic suspension systems with integrable propulsion.

One aspect of the invention is a system for magnetically levitating a load, the system comprising at least two lift generators, each comprising a source of magnetic flux configured to induce a magnetic flux in a rail via a leg on either side of the rail, at least one magnetically permeable beam connecting the lift generators, and control circuitry configured to generate a magnetic flux through the beam so as to maintain gaps between the legs and rail.

Another aspect of the invention is a method of magnetically levitating a load, the method comprising positioning a first source of magnetic flux proximal to a first rail, thereby inducing a first magnetic flux in the first rail, positioning a second source of magnetic flux proximal to a second rail, thereby inducing a second magnetic flux in a second rail, and manipulating the magnetic current in a magnetically permeable beam connecting the first source of magnetic flux to the second source of magnetic flux.

Another aspect of the invention is a rail system for magnetically levitating a platform, the rail system comprising a first rail, a second rail oriented substantially parallel to the first rail, at least one magnetically permeable beam connecting the first and second rail, and control circuitry configured to generate a magnetic flux through the beam so as to maintain gaps between the legs of a platform and at least one of the first and second rail, wherein the gaps defined by the legs on either side of the rail are of unequal size.

DETAILED DESCRIPTION OF CERTAIN EMBODIMENTS

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

Figure 1:
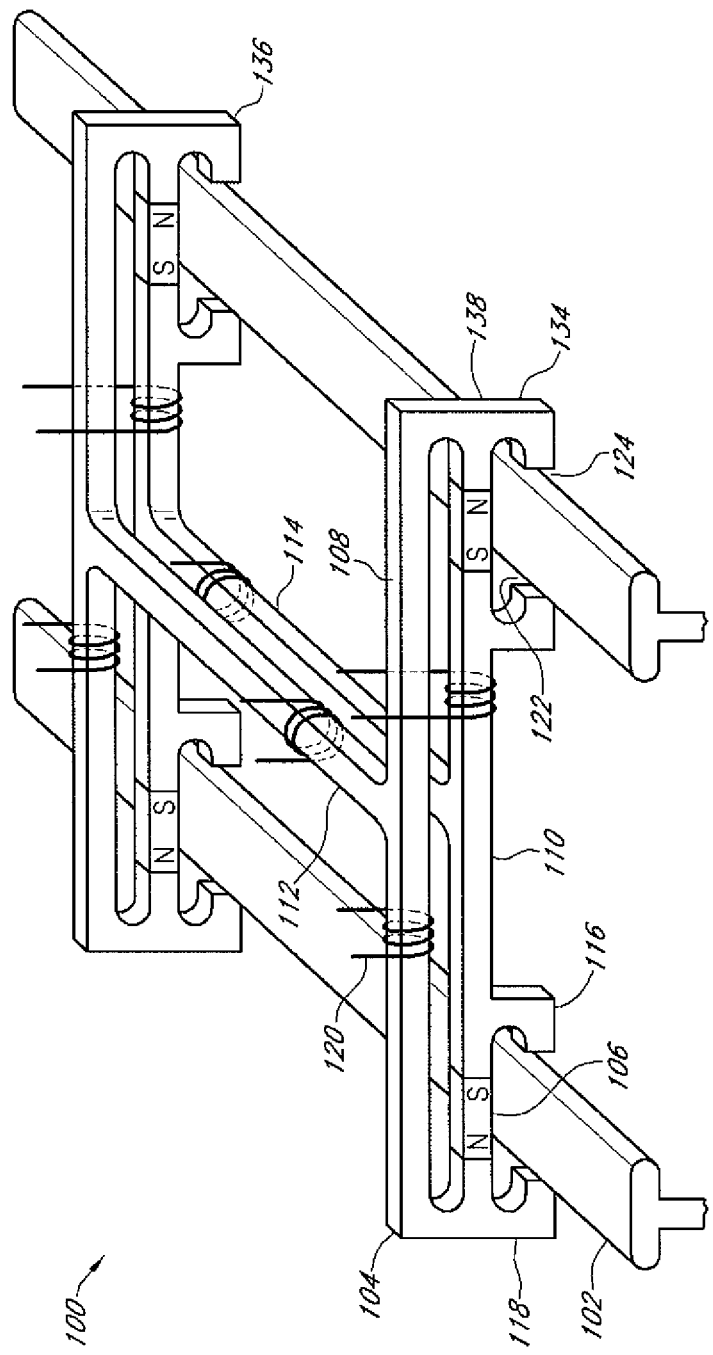
FIG. 1 is an embodiment of a levitating rail system, wherein the frame comprises two platforms.

FIG. 1 is an embodiment of a levitating rail system, wherein the frame comprises two platforms. The system 100 comprises a frame 104 situated over a pair of rails 102. The rails 102 may be specially-designed as part of the system 100 or may be conventional steel rails as used with most railroad tracks. The frame 104 comprises a front platform 134 and a rear platform 136 connected by an upper axial crossbar 112 and lower axial crossbar 114. In other embodiments of the system, fewer or a greater number of platforms may be used. In still other embodiments, there may be fewer or a greater number of axial crossbars connecting each platform. Upon the frame 104, one may place a load, which is to be suspended above the tracks. The load may be, for example, a passenger railcar, a shipping container, or any of a number of things. The load may also be the frame 104 itself. The system 100 is designed such that the addition of a sizable load does not inhibit the levitating capabilities of the frame 104 over the rails 102. In an embodiment of the system, the frame 104 does not contact rails 102. This configuration has the benefit of reducing certain effects caused by friction including wear on the mechanical parts, excess generated heat, and noise. In other embodiments, the frame 104 does contact the rails. Such contact may be incidental or may further serve to improve balance and control of the frame. In some embodiments, a propulsion system may be configured to contact the rails to provide forward motion while the load-bearing components are magnetically-levitated.

Each platform comprises two lift generators 138 connected by an upper horizontal crossbar 108 and lower horizontal crossbar 110. In some embodiments of the system, fewer or a greater number of lift generators may be used. In still other embodiments, there may be fewer or greater number of horizontal crossbars connecting each lift generator. The lift generator 138 functions in much the same way as the spring and wheel of a car, in providing the weight-bearing functionality of the system. The lift generator 138 comprises a magnet 106, an inner leg 116, and an outer leg 118. The lift generator 138 is positioned such that the magnet is generally over the rail 102, and each of the legs straddle the rail 102, thereby defining an inner rail gap 122 between the inner leg 116 and the rail and an outer rail gap 124 between the outer leg 118 and the rail. In other embodiments, the magnet 106 may not placed directly over the rail. For example, the magnet 106 may be embodied in other the inner leg 116 or outer leg 118. In still other embodiments, there may be a plurality of magnets in each lift generator. The magnet 106 may be a permanent magnet, an electromagnet, or a combination of both. The magnet 106 may be a permanent magnet using an alloy of rare earth elements. For example, the magnet 106 may be a neodymium magnet or a samarium-cobalt magnet. Neodymium magnets have the advantages of being both affordable and having a strong magnetic field.

Each lift generator 138 performs its function using the forces of magnetic attraction. The magnet 106 magnetizes the inner leg 116 and outer leg 118 with opposite polarity. Both the inner leg 116 and outer leg 118 are attracted to the rail 102. This attraction prevents the frame 104 from lowering. Explained another way, the lift generator 138 creates a closed magnetic loop. As described in relation to the left front lift generator, the magnetic flux flows from the north pole of the magnet 106, down the outer leg 118, across the outer rail gap 124, through the rail 102, across the inner rail gap 122, up the inner leg 116, and to the south pole of the magnet 106. Magnetic forces resist extension of this closed loop of magnetic current. Each lift generator of the frame 104 operates using similar principles. The inner rail gap 112 and outer rail gap 124 may be designed to have unequal size, as described in more detail below.

As mentioned, the left and right lift generators are connected by one or more horizontal crossbars 108, 110. The connection of the lift generators 138 provides lateral control capability to the system. Additionally, control coils 120 may be placed on any of the crossbars to influence and control the dynamics of the system. By generating an electric current through one of the control coils 120, a magnetic flux is induced in the crossbar to which the control coil 120 is attached. A control coil 120 may be placed on the upper horizontal crossbar 108, lower horizontal crossbar 110, upper axial crossbar 112, lower axial crossbar 114, inner leg 116, or outer leg 118. In some embodiments of the system, there is only one control coil 120. In other embodiments of the system, there is more than one control coil 120. In still other embodiments of the system, there is more than one control coil 120 placed on the same crossbar. A control coil 120 may be placed upon the lower horizontal crossbar 110 to produce forces in the horizontal direction. The electric current through the control coil 120 may be controlled by a sensor such that the frame 104 remains centered on the track. This may be enabled by magnetically connecting the rails 102 with a rail crossbar as will described later with respect to FIG. 2. Thus, in some embodiments, a control coil 120 may comprise a coil of wire, wrapped around a part of the frame 104, a sensor to determine the need for electric current through the wire, a computing module to compute how much electric current to generate through the wire, and/or an electric current source to generate the electric current through the wire. A control coil 120 placed upon the lower axial crossbar 114 between the front platform 134 and the rear platform 136 could be employed to compensate for rail permeability variations at different points on the rails 102, thereby reducing mechanical strain on the frame 104. Additionally, a control coil 120 placed upon the lower axial crossbar 114 could be used to differentially change the amount of lift generated by the front platform 134 relative to the rear platform 136 to affect the pitch of the system or to balance an uneven load. Control coils 120 may also be placed upon the inner leg 116 and outer leg 118 of a lift generator 134 to differentially affect the roll of each lift generator 134 to balance a load or reduce mechanical strain on the system.

Figure 2:
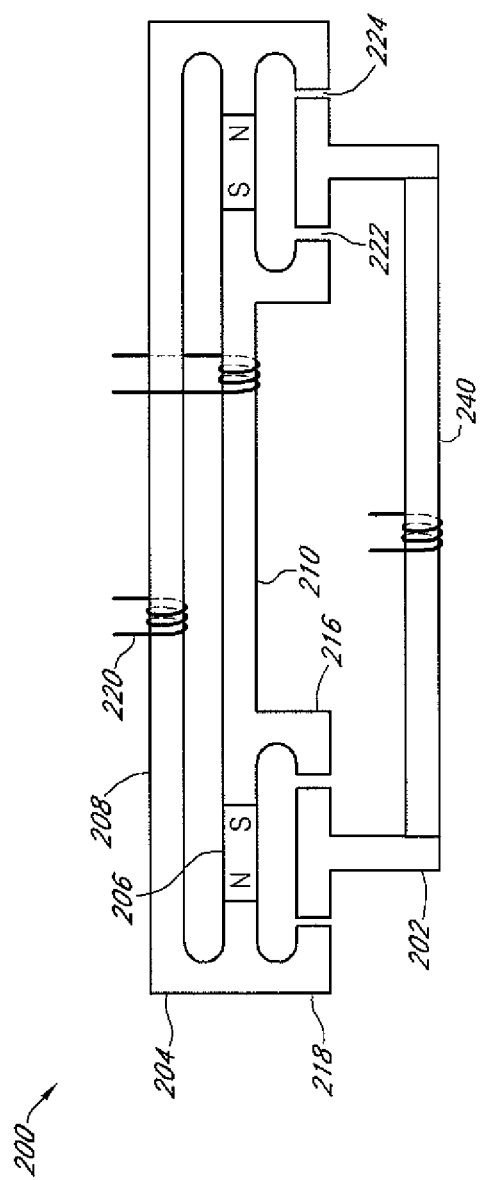
FIG. 2 is a cross-section of one embodiment of a platform.

FIG. 2 is a cross-section of one embodiment of a platform. The platform 234 comprises two lift generators 238 connected by an upper horizontal crossbar 208 and a lower horizontal crossbar 210. Each lift generator comprises a magnet 206, an inner leg 216, and an outer leg 218. The platform 234 is situated over a rail 202 thereby defining, for each lift generator 238, an inner rail gap 222 and an outer rail gap 224. In this embodiment, the rail(s) 202 are connected horizontally by a rail crossbar 240. Control coils 220 are place on the upper horizontal crossbar 208, the lower horizontal crossbar 210, and the rail crossbar 240. In this embodiment, the inner rail gap 222 and outer rail gap 224 are of a different size. In this configuration, only one of the four shown legs 216, 218 can contact the rail 202 at any one time. If the inner rail gap 222 and outer rail gap 224 were of equal size, then two of the four shown legs could contact the rail simultaneously, thereby completing a magnetic current between the two lift generators 238 through the rail 202. Lateral control in this embodiment is produced by the electromagnetic flux of the control coil 220 passing through both inter gaps 222 and/or both outer gaps 224. Magnetic current (and flux) is either direction adds to the flux of the magnet 206 on one side and subtracts from the flux of the magnet 206 on the opposite side, as the two magnets are oppositely polarized. It is for this reason that a magnetic connection, e.g. via rail crossbar 240, may be advantageous employed between the two rails 202. The connections do not short out the magnets 206 because the permeable connection is between similar poles, i.e. north to north or south to south. Such a control techniques has been referred to as permanent magnet bias control.

Figure 3:
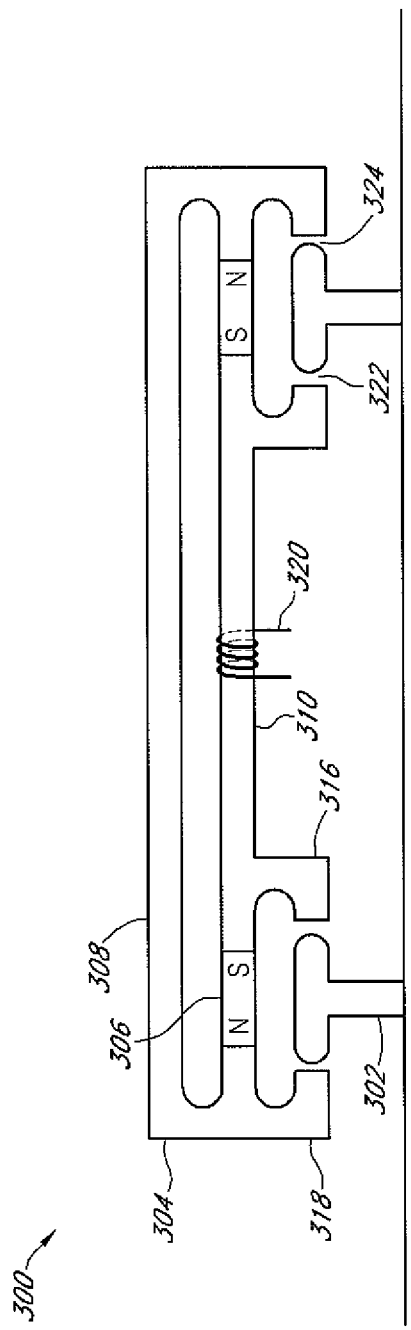
FIG. 3 is a cross-section of another embodiment of a platform.

FIG. 3 is a cross-section of another embodiment of a platform lacking lateral control stability via a rail crossbar. In this embodiment, the platform 300 comprises two lift generators 338 connected by an upper horizontal crossbar 308 and a lower horizontal crossbar 310. Each lift generator comprises a magnet 306, an inner leg 316, and an outer leg 318. The platform 334 is situated over a set of rails 302 thereby defining, for each lift generator 338, an inner rail gap 322 and an outer rail gap 324. In this embodiment, the rails are magnetically separate. A single control coil 320 is located on the lower horizontal crossbar 310. Using this configuration, it would be possible to construct a levitating rail system on conventional railroad tracks.

Figure 4:
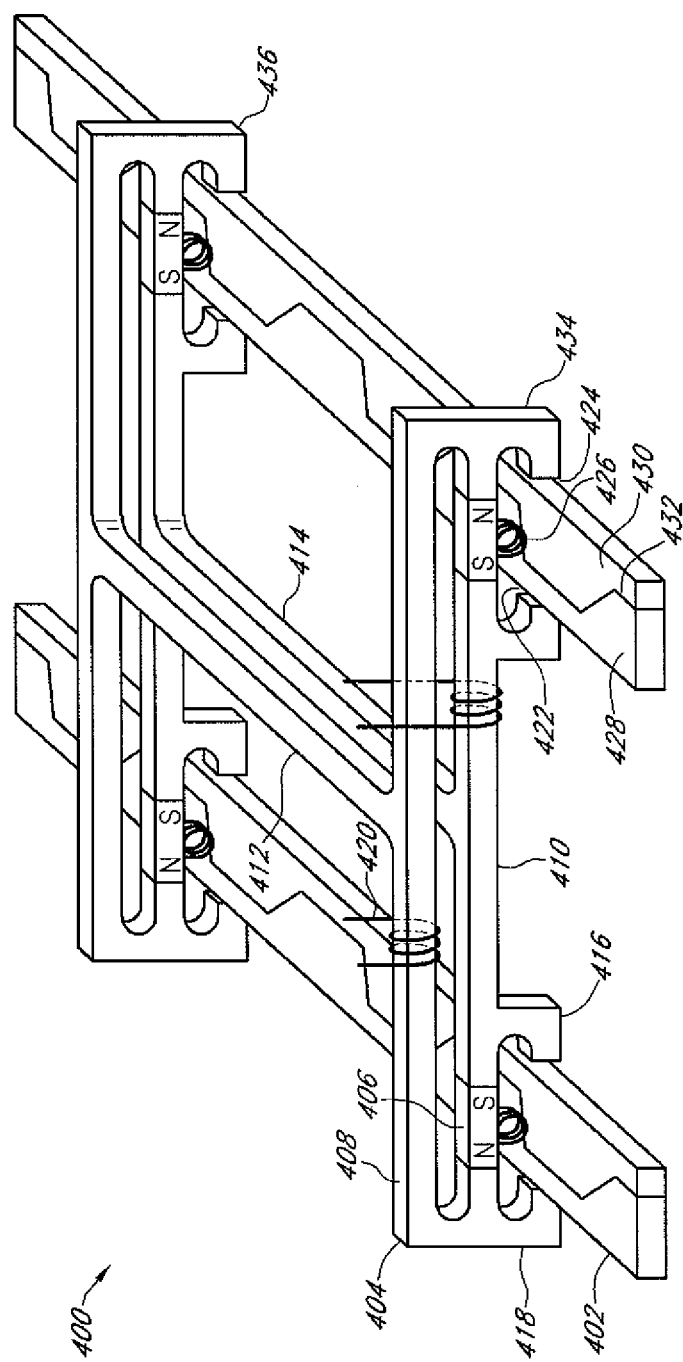
FIG. 4 is an embodiment of a levitating rail system with an integrated propulsion system.

FIG. 4 is an embodiment of a levitating rail system with an integrated propulsion system. The system 400 comprises a frame 404 situated over a set of rails 402. The rail 402 comprises an inner rail piece 428 and an outer rail piece 430 separated by a non-conductive separator 432. The frame comprises a front platform 434 and a rear platform 436 connected by an upper axial crossbar 412 and lower axial crossbar 414. In other embodiments of the system, fewer or a greater number of platforms may be used. In still other embodiments, there may be fewer or a greater number of axial crossbars connecting each platform. Upon the frame 404, one may place a load, which is to be suspended above the tracks. In one embodiment of the system, the frame 404 does not contact the rails 402. In other embodiments, the frame 104 does contact the rails.

Each platform comprises two lift generators 438 connected by an upper horizontal crossbar 408 and lower horizontal crossbar 410. In some embodiments of the system, fewer or a greater number of lift generators may be used. In still other embodiments, there may be fewer or greater number of horizontal crossbars connecting each lift generator. The lift generator 438 comprises a magnet 406, an inner leg 416, an outer leg 418, and an armature coil 426. The lift generator 438 is positioned such that the magnet is generally over the rail 402, and each of the legs straddle the rail 402, thereby defining an inner rail gap 422 between the inner leg 416 and the rail and an outer rail gap 424 between the outer leg 418 and the rail. In other embodiments, the magnet 406 may not be placed directly over the rail. For example, the magnet 406 may be embodied in other the inner leg 416 or outer leg 418. In still other embodiments, there may be a plurality of magnets in each lift generator. In one embodiment, the armature coil is connected to the lift generator proximal to the magnet 406 and located over the rail 402. In other embodiments, the armature coil 426 may be embodied in a different location. The armature coil 426 may be embodied, for example, in either the inner leg 416 or outer leg 418. The rail 402 may be positioned advantageously with respect to the armature coil 426. The armature windings may be a multiphase coil with phases distributed axially such that a number of phases are equal in length to a pole pair in a DC motor. In some embodiments, the armature coil 426 may comprise a 3-phase coil.

In this system, the lift generator 438 performs two functions, generating lift to keep the frame levitating above the rail 402, and generating propulsive force through the use of the armature coil 426. In some embodiments, the lift generator 438 may also produce guiding forces to center the yoke legs on the rail with clearance for non-contacting operation. The lift generator 438 generates lift, as described with respect to FIG. 1, using the forces of magnetic attraction. The lift generator 438 creates a closed magnetic loop. As described in relation to the left front lift generator, a magnetic current flows from the north pole of the magnet 406, down the outer leg 418, across the outer rail gap 424, through the rail 402, across the inner rail gap 422, up the inner leg 416, and to the south pole of the magnet 406. Magnetic forces resist extension of this closed loop of magnetic current. Each lift generator of the frame 404 operates using similar principles.

As stated above, the lift generators 438 also generate propulsive force through the use of the armature coil 426. The magnet 406 induces a magnetic field in the inner leg 416, the outer leg 418, and the rail 402. In this case, the rail comprises two pieces, an inner rail piece 428 and an outer rail piece 430. The inner rail piece 428 and the outer rail piece 430 are induced with a magnetic field of opposite polarity. In one embodiment, the armature coil 426 comprises an electromagnet such as a multiphase coil axially distributed such that armature currents react with rail poles to produce force in the desired direction. As the armature coil 426 is, in some embodiments, an electromagnet, its polarity can be reversed by reversing the electric current. Propulsion is thus achieved by normal DC motor action. In some embodiments, the armature coil 428 may include commutation circuitry to coordinate the changing of polarity. In other embodiments, the commutation circuitry may be consolidated, such that one module controls the commutation of the armature coil 426 in each of the lift generators 438.

The rails 402, as shown in FIG. 4, comprise an inner rail piece 428, an identical but shifted outer rail piece 430, and a non-conductive separator 432. This is not the only envisioned rail configuration. The inner rail piece 428 and outer rail piece 430 may be, for example, not identical. The inner rail piece 428 may comprise more material than the outer rail piece 430. As described above, the magnet 406 induces magnetic fields having opposite polarity in the inner rail piece 428 and outer rail piece 430. The passing frame 404 sees the rails as a series of alternating north and south poles. The pole spacing may be configured to facilitate propulsion based on the length of the armature coil 426, which may be related to the axial length of the front or rear platform 434, 436.

As was described with respect to FIG. 1 and FIG. 2, the left and right lift generators 438 of FIG. 4 are connected by one or more horizontal crossbars 408, 410. Control coils 420 may be placed on any of the crossbars to influence and control the dynamics of the system. A control coil 420 may be placed on the upper horizontal crossbar 408, lower horizontal crossbar 410, upper axial crossbar 412, lower axial crossbar 414, inner leg 416, or outer leg 418. In some embodiments of the system, there is only one control coil 420. In other embodiments of the system, there is more than one control coil 420. In still other embodiments of the system, there is more than one control coil 420 placed on the same crossbar. The electric current through the control coil 420 may be controlled by a sensor such that the frame 404 remains centered on the track. Thus, in some embodiments, a control coil 420 may comprise a coil of wire, wrapped around a part of the frame 404, a sensor to determine the need for electric current through the wire, a computing module to compute how much electric current to generate through the wire, and/or an electric current source to generate the electric current through the wire. A control coil 420 placed upon the lower axial crossbar 414 between the front platform 434 and the rear platform 436 could be employed to compensate for differences in the rail permeability at different points on the rails 402, thereby reducing mechanical strain on the frame 404. Additionally, a control coil 420 placed upon the lower axial crossbar 414 could be used to differentially change the amount of lift generated by the front platform 434 relative to the rear platform 436 to effect the pitch of the system or to balance an uneven load. Control coils 420 may also be placed upon the inner leg 416 and outer leg 418 of a lift generator 434 to differentially affect the roll of each lift generator 434 to balance a load or reduce mechanical strain on the system. Although not shown, the system of FIG. 4 may also comprise rail crossbars magnetically connecting the inner and outer rail pieces respectively, as will be described below with respect to FIG. 5.

Figure 5:
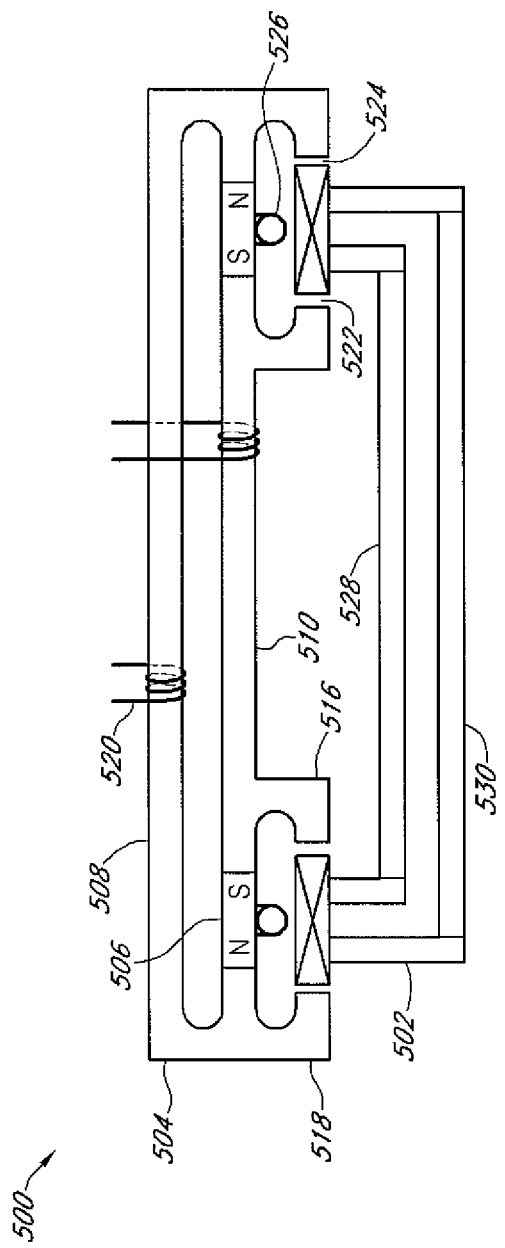
FIG. 5 is cross-section of one embodiment of a levitating platform with an integrated propulsion system.

FIG. 5 is cross-section of one embodiment of a levitating platform with integrated propulsion means. The platform 534 comprises two lift generators 538 connected by an upper horizontal crossbar 508 and a lower horizontal crossbar 510. Each lift generator comprises a magnet 506, an inner leg 516, an outer leg 518, and an armature coil 526. The platform 500 is situated over a rail 502 thereby defining, for each lift generator 538, an inner rail gap 522 and an outer rail gap 524. The rail 502 comprises an inner rail piece 528, an outer rail piece 530, and a non-conductive separator (not shown). In this embodiment, the inner rail pieces 528 are connected horizontally by rail crossbar 528 and similarly, the outer rail pieces 530 are connected horizontally by rail crossbar 530. Control coils 220 are placed on the upper horizontal crossbar 508, and the lower horizontal crossbar 510. In this embodiment, the inner rail gap 522 and outer rail gap 524 are of a different size. In this configuration, only one of the four shown legs 516, 518 can contact the rail 502 at any one time.

It is to be understood that while a single propulsion method using magnetic forces was described, the levitating platform could be propelled using any of a number of propulsion methods well-known in the art. The platforms could, for example, be connected to a conventional, wheeled locomotive engine. The benefits of levitating platforms as opposed to wheeled carts are, among other things, the reduction of wear on mechanical parts, the reduction of extraneous heat produced, and the reduction of noise. Even a hybrid levitation/wheeled system has the potential to be more energy efficient than conventional systems. Still other wheeled or levitating propulsion means could be used.

While the above description has pointed out novel features of the invention as applied to various embodiments, the skilled person will understand that various omissions, substitutions, and changes in the form and details of the device or process illustrated may be made without departing from the scope of the invention. For example, although embodiments of the invention have been described with reference to uncompressed video data, those embodiments can be applied to compressed video data as well. Therefore, the scope of the invention is defined by the appended claims rather than by the foregoing description. All variations coming within the meaning and range of equivalency of the claims are embraced within their scope.

What is claimed is:

1. A method of magnetically levitating a load, the method comprising:
    inducing a magnetic flux in a first rail of a track via a first leg spaced apart horizontally from a first side of the first rail and a second leg spaced apart horizontally from a second side of the first rail, wherein the first side of the first rail is opposite the second side of the first rail, and wherein a first gap is defined between the first leg and the first rail and a second gap is defined between the second leg and the first rail;
    inducing a magnetic flux in a second rail of the track via a third leg spaced apart horizontally from a first side of the second rail and a fourth leg spaced apart horizontally from a second side of the second rail, wherein the first side of second rail is opposite the second side of the second rail, and wherein a third gap is defined between the third leg and the second rail and a fourth gap is defined between the fourth leg and the second rail; and
    varying a magnitude of a magnetic flux in at least one magnetically permeable beam connecting the first source of magnetic flux to the second source of magnetic flux, wherein the first gap and the second gap are of unequal size.

2. The method of claim 1, wherein the first gap is larger than the second gap.

3. The method of claim 1, further comprising varying a magnitude of an electric current through at least one conductive coil oriented in the same direction as the first rail to control the motion of first source of magnetic flux with respect to the first rail.

4. The method of claim 1, further comprising sensing the position of at least one of the legs with respect to at least one of the rails.

5. The method of claim 1, further comprising placing a load upon a frame coupled to the first source of magnetic flux and the second source of magnetic flux.

6. A system for magnetically levitating a load, the system comprising:
    means for inducing a magnetic flux in a first rail via a first leg spaced apart horizontally from a first side of the first rail and a second leg spaced apart horizontally from a second side of the first rail, wherein the first side of the first rail is opposite the second side of the first rail, and wherein a first gap is defined between the first leg and the first rail and a second gap is defined between the second leg and the first rail;
    means for inducing a magnetic flux in a second rail via a third leg spaced apart horizontally from a first side of the second rail and a fourth leg spaced apart horizontally from a second side of the second rail, wherein the first side of the second rail is opposite the second side of the second rail, and wherein a third gap is defined between the third leg and the second rail and a fourth gap is defined between the fourth leg and the second rail; and
    means for varying a magnitude of a magnetic flux in at least one magnetically permeable beam connecting the means for inducing a magnetic flux in a first rail and the means for inducing a magnetic flux in a second rail, wherein the first gap and the second gap are of unequal size.

7. The system of claim 6, wherein the means for inducing a magnetic flux in a first rail comprises a permanent magnet.

8. The system of claim 6, further comprising means for varying a magnitude of an electric current through at least one conductive coil oriented in the same direction as the first rail to control the motion of the system with respect to the rails.

9. The system of claim 6, further comprising means for sensing the position of at least one of the legs with respect to at least one of the rails.

10. The system of claim 6, further comprising means for supporting a load above the means for inducing a magnetic flux in a first rail and the means for inducing a magnetic flux in a second rail.

11. A method of making a system for magnetically levitating a load, the method comprising:
    providing a first source of magnetic flux configured to induce a magnetic flux in a first rail of a track via a first leg spaced apart horizontally from a first side of the first rail and a second leg spaced apart horizontally from a second side of the first rail, wherein the first side of the first rail is opposite the second side of the first rail, and wherein a first gap is defined between the first leg and the first rail and a second gap is defined between the second leg and the first rail;
    providing a second source of magnetic flux configured to induce a magnetic flux in a second rail of the track via a third leg spaced apart horizontally from a first side of the second rail and a fourth leg spaced apart horizontally from a second side of the second rail, wherein the first side of second rail is opposite the second side of the second rail, and wherein a third gap is defined between the third leg and the second rail and a fourth gap is defined between the fourth leg and the second rail;
    connecting the first source of magnetic flux and the second source of magnetic flux with at least one magnetically permeable beam; and
    configuring control circuitry to vary a magnitude of a magnetic flux in the at least one magnetically permeable beam, wherein the first gap and the second gap are of unequal size.

12. The method of claim 11, wherein the first source of magnetic flux comprises a permanent magnet.

13. The method of claim 11, wherein the first gap is larger than the second gap.

14. The method of claim 11, further comprising configuring propulsion circuitry to vary a magnitude of an electric current through at least one conductive coil oriented in the same direction as the first rail to control the motion of first source of magnetic flux with respect to the first rail.

15. The method of claim 11, further comprising coupling a frame to the first source of magnetic flux and the second source of magnetic flux.

16. A system for magnetically levitating a load, the system comprising:
    a first source of magnetic flux configured to induce a magnetic flux in a first rail of a track via a first leg spaced apart horizontally from a first side of the first rail and a second leg spaced apart horizontally from a second side of the first rail, wherein the first side of the first rail is opposite the second side of the first rail, and wherein a first gap is defined between the first leg and the first rail and a second gap is defined between the second leg and the first rail;

a second source of magnetic flux configured to induce a magnetic flux in a second rail of the track via a third leg spaced apart horizontally from a first side of the second rail and a fourth leg spaced apart horizontally from a second side of the second rail, wherein the first side of second rail is opposite the second side of the second rail, and wherein a third gap is defined between the third leg and the second rail and a fourth gap is defined between the fourth leg and the second rail; and control circuitry configured to vary a magnitude of a magnetic flux in at least one magnetically permeable beam connecting the first source of magnetic flux to the second source of magnetic flux, wherein the first gap and the second gap are of unequal size.

17. The system of claim 16, wherein the first source of magnetic flux comprises a permanent magnet.

18. The system of claim 16, further comprising propulsion circuitry configured to vary a magnitude of an electric current through at least one conductive coil oriented in the same direction as the first rail to control the motion Of the system with respect to the rails.

19. The system of claim 16, further comprising a sensor configured to sense the position of at least one of legs with respect to at least one of the rails.

20. The system of claim 16, further comprising a frame configured to support a load, wherein the frame is coupled to the first source of magnetic flux and the second source of magnetic flux.

* * * * *